(12) United States Patent
Mizoguchi

(10) Patent No.: US 8,556,335 B2
(45) Date of Patent: Oct. 15, 2013

(54) VEHICLE BOTTOM STRUCTURE

(75) Inventor: Hiroo Mizoguchi, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 8 days.

(21) Appl. No.: 13/533,751

(22) Filed: Jun. 26, 2012

(65) Prior Publication Data

US 2012/0326469 A1     Dec. 27, 2012

(30) Foreign Application Priority Data

Jun. 27, 2011   (JP) ................................ 2011-142339

(51) Int. Cl.
*B62D 21/15* (2006.01)
(52) U.S. Cl.
USPC ....... 296/187.11; 180/296; 280/784; 280/834
(58) Field of Classification Search
USPC ............... 296/187.11; 180/296; 280/784, 834
See application file for complete search history.

(56) References Cited

U.S. PATENT DOCUMENTS 5,381,871 A * 1/1995 Ohta ............................ 180/296

FOREIGN PATENT DOCUMENTS

| JP | 06-033757 | 2/1994 |
| JP | 2004-148981 | 5/2004 |
| JP | 2009-013826 | 1/2009 |

* cited by examiner

*Primary Examiner* — Joseph Pape
(74) *Attorney, Agent, or Firm* — Silicon Valley Patent Group LLP

(57) ABSTRACT

A vehicle bottom structure is provided which, in the case where a vehicle is involved in an accident such as a rear-end collision, can prevent an exhaust system component reaching a high temperature from being brought into contact with a fuel tank without causing any trouble. A vehicle bottom structure according to the present invention includes a suspension member installed between a fuel tank and a muffler silencer and extending in the width direction of the vehicle, and a stopping member suspended from the bottom of the vehicle between the suspension member and the muffler silencer, the vertical position of the sopping member overlapping the vertical position of the muffler silencer. The suspension member is on a trajectory obtained by rotating the stopping member to the front side of the vehicle around the point at which the stopping member is suspended from the bottom of the vehicle.

5 Claims, 6 Drawing Sheets

SECTION A-A

VEHICLE BOTTOM STRUCTURE

CROSS-REFERENCE TO RELATED APPLICATIONS

This application is based upon and claims the benefit of priority from the prior Japanese Patent Application No. 2011-142339, filed on Jun. 27, 2011, the entire contents of which are incorporated herein by reference.

BACKGROUND OF THE INVENTION

1. Field of the Invention

The present invention relates to a vehicle bottom structure in which a fuel tank made of resin is mounted to the bottom of a vehicle, a muffler silencer is installed rearward of the fuel tank, and a muffler pipe extending from the front of the vehicle passes the side of the fuel tank and is connected to the muffler silencer.

2. Background of the Invention

In recent years, the material for fuel tanks has changed from sheet metal to resin to handle increasingly complicated shapes of vehicle body floors. Generally, a fuel tank is mounted to the bottom of a vehicle on the rear side thereof, and exhaust system components (a muffler pipe, a muffler silencer, and the like) reaching a high temperature are disposed around the fuel tank. In cases where the fuel tank is made of resin, it is necessary to take measures to prevent the exhaust system components from being brought into contact with the fuel tank when the vehicle is involved in an accident such as a rear-end collision.

Japanese Patent Laid-Open Publication No. 2004-148981 discloses a technology in which a rear bumper stay disposed rearward of a muffler silencer is provided with a pressing bracket pressing the muffler silencer downward when the rear bumper stay is displaced forward. According to Japanese Patent Laid-Open Publication No. 2004-148981, in cases where a vehicle is involved in a rear-end collision, the pressing bracket enables the muffler silencer to be forcibly pushed down, and the muffler silencer can be prevented from being brought into contact with the fuel tank.

With the technology disclosed in Japanese Patent Laid-Open Publication No. 2004-148981, since the muffler silencer is forcibly pushed down when the vehicle is involved in a rear-end collision, a muffler pipe and the like are also pushed down following the movement of the muffler silencer. That is to say, the technology disclosed in Japanese Patent Laid-Open Publication No. 2004-148981 positively allows downward displacement of the muffler silencer including the exhaust system components connected thereto. Here, in cases where a plurality of exhaust system components are positively displaced downward, these components may be brought into contact with the ground, and this displacement may cause the vehicle body to be damaged more than necessary.

The present invention has been made in view of the above-described problems, and it is an object thereof to provide a vehicle bottom structure that, in the case where a vehicle is involved in an accident such as a rear-end collision, can prevent an exhaust system component reaching a high temperature from being brought into contact with a fuel tank without causing any trouble.

SUMMARY

In order to solve the above-described problems, a typical configuration of the present invention is a vehicle bottom structure for a vehicle in which a fuel tank made of resin is mounted to a bottom of the vehicle, a muffler silencer is installed rearward of the fuel tank, and a muffler pipe extending from a front of the vehicle passes the side of the fuel tank and is connected to the muffler silencer, the structure including a suspension member installed between the fuel tank and the muffler silencer and extending in a width direction of the vehicle, and a stopping member suspended from the bottom of the vehicle between the suspension member and the muffler silencer, a vertical position of the stopping member overlapping a vertical position of the muffler silencer, wherein the suspension member is on a trajectory obtained by rotating the stopping member to a front side of the vehicle around a point at which the stopping member is suspended from the bottom of the vehicle.

With the above-described configuration, if the vehicle is involved in an accident such as a rear-end collision and a load toward the front of the vehicle is applied to the muffler silencer, the stopping member rotates to the front side of the vehicle while receiving the muffler silencer. Then, the stopping member comes into contact with the suspension member on the rotation trajectory, and displacement of the muffler silencer is stopped. Thus, the exhaust system components reaching a high temperature, namely, the muffler pipe and the muffler silencer can be prevented from being brought into contact with the fuel tank.

It is preferable that the stopping member includes a frame portion formed by bending a steel bar into an annular shape and coupled to the bottom of the vehicle at both ends of the frame portion. In particular, it is preferable that the steel bar is a round steel bar. Providing the above-described frame portion as a portion receiving the muffler silencer if the vehicle is involved in an accident such as a rear-end collision enables manufacturing at a low cost while achieving the necessary strength.

In order to solve the above-described problems, another typical configuration of the present invention is a vehicle bottom structure including a bottom of a vehicle in which a fuel tank made of resin is mounted, a muffler silencer is installed rearward of the fuel tank, and a muffler pipe extending from a front of the vehicle passes the side of the fuel tank and is connected to the muffler silencer, the structure including a stopping member suspended from the bottom of the vehicle between the fuel tank and the muffler silencer, a vertical position of the stopping member overlapping a vertical position of the muffler silencer, wherein the stopping member includes a hanging portion hanging down from the bottom of the vehicle to a location between the upper and lower ends of the muffler silencer and a bent portion extending downward from a lower end of the hanging portion while approaching the muffler silencer.

With the above-described configuration, if the vehicle is involved in an accident such as a rear-end collision and a vehicle body rear floor deforms in such a manner that it is lifted up, the stopping member follows the deformation of the vehicle body rear floor and deforms so as to rotate to the rear side of the vehicle. Then, the stopping member and the vehicle body rear floor sandwich the muffler silencer, so that the stopping member suppresses displacement of the muffler silencer toward the front of the vehicle. Accordingly, the exhaust system components reaching a high temperature can be prevented from being brought into contact with the fuel tank.

It is preferable that the stopping member is suspended from the bottom of the vehicle on a side, in a width direction of the vehicle, where the muffler pipe is connected to the muffler silencer. Installing the stopping member on the side where the muffler pipe extending from the front of the vehicle passes the side of the fuel tank and is connected to the muffler silencer enables the exhaust system components to be effectively prevented from being brought into contact with the fuel tank.

According to the present invention, it is possible to provide a vehicle bottom structure that, in the case where a vehicle is involved in an accident such as a rear-end collision, can prevent an exhaust system component reaching a high temperature from being brought into contact with a fuel tank without causing any trouble.

BRIEF DESCRIPTION OF THE DRAWINGS

Embodiments of the invention will be described, by way of example only, with reference to the drawings.

DETAILED DESCRIPTION OF THE INVENTION

Figure 1:
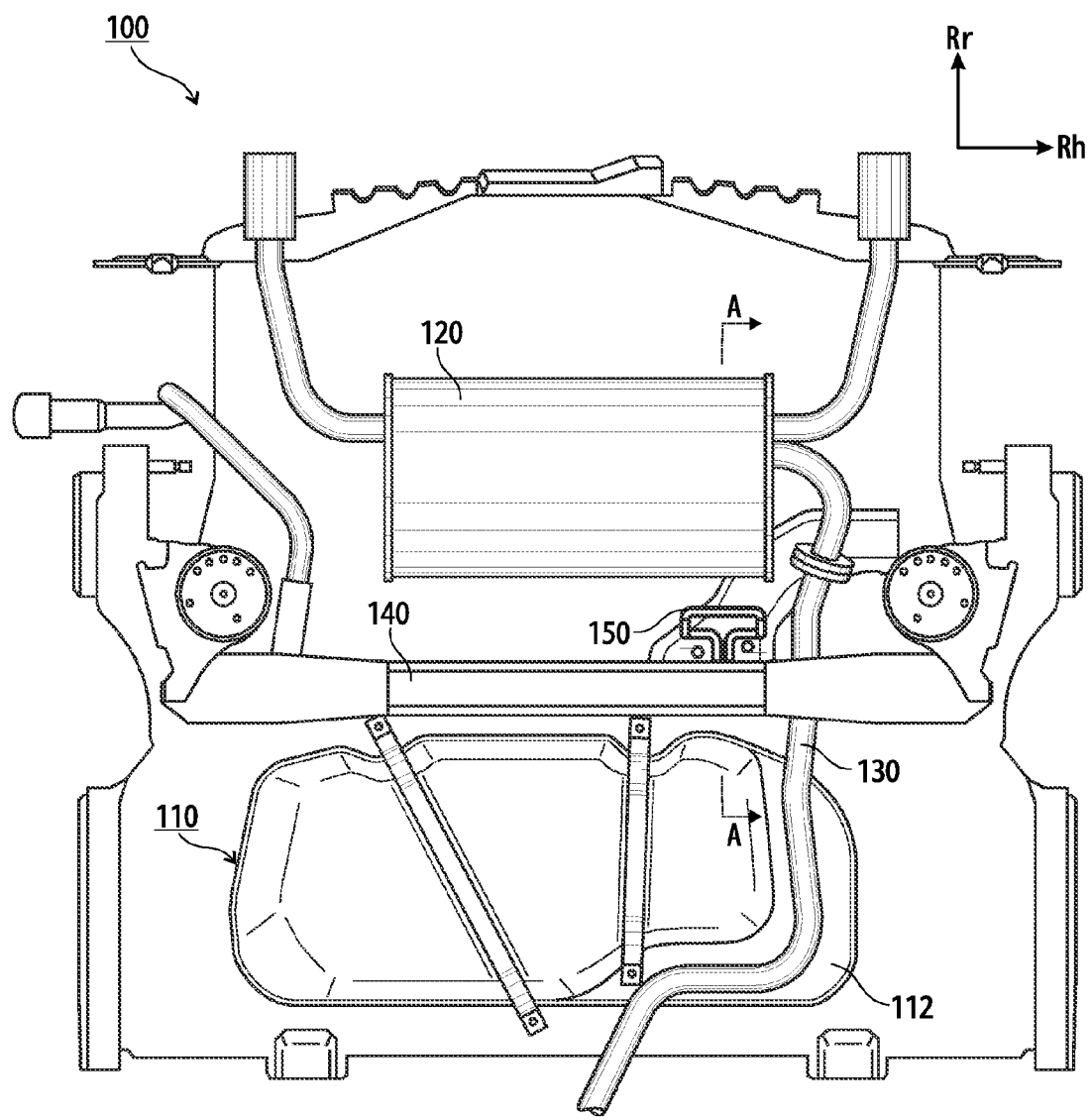
FIG. 1 is a bottom view of a vehicle to which a first embodiment of a vehicle bottom structure according to the present invention is applied.

Hereinafter, preferred embodiments of the present invention will be described in detail with reference to the accompanying drawings. Dimensions, materials, and other specific numerical values described in the embodiments are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence redundant description has been omitted. Also, illustration of elements that are not directly relevant to the present invention has been omitted.

First Embodiment

Figure 2:
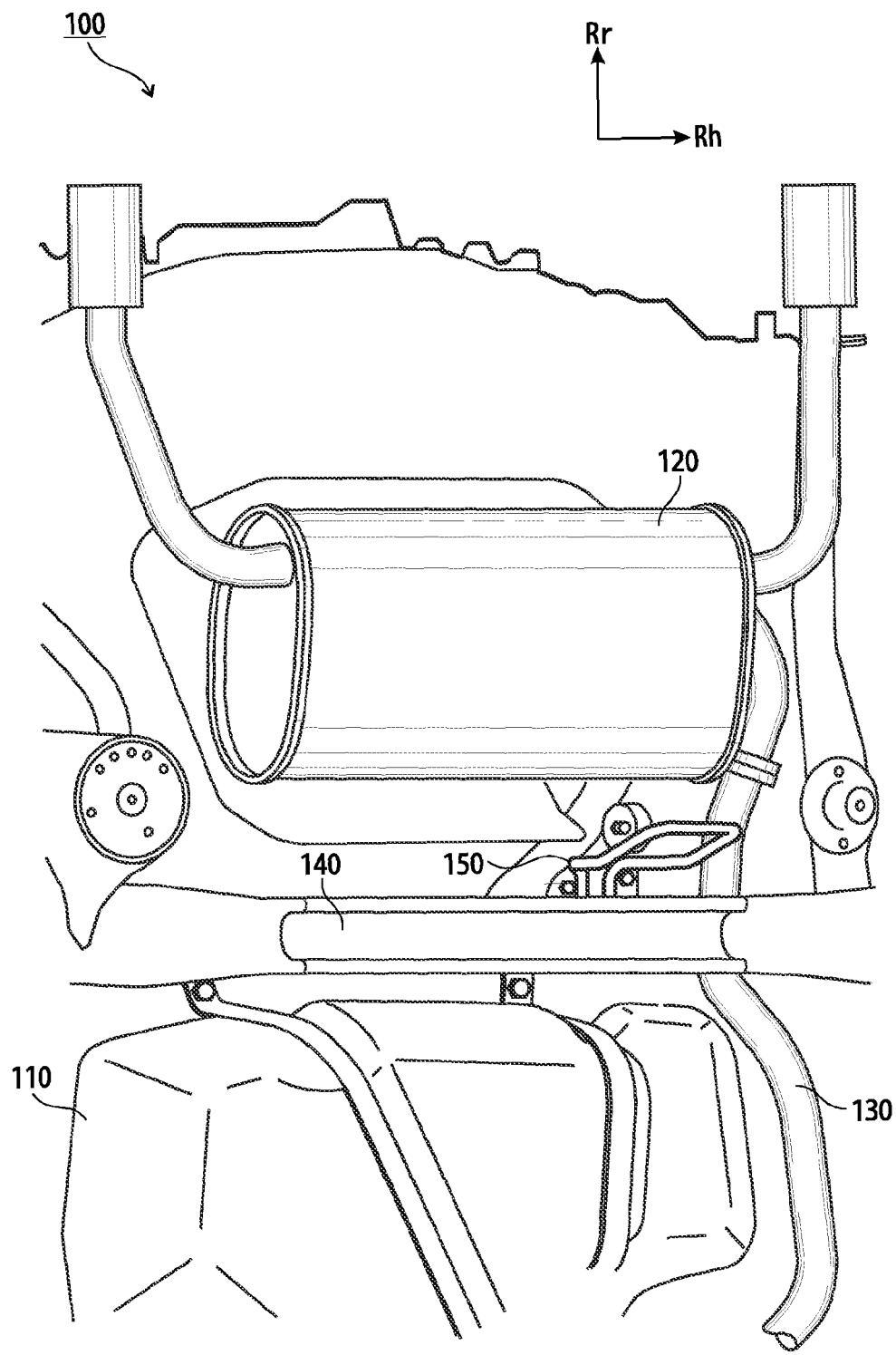
FIG. 2 is a perspective bottom view of the vehicle shown in FIG. 1.

FIG. 1 is a bottom view of a vehicle to which a first embodiment of a vehicle bottom structure according to the present invention (vehicle bottom structure 100) is applied. FIG. 2 is a perspective bottom view of the vehicle shown in FIG. 1. It should be noted that in the drawings, arrow Rr indicates a rear side of the vehicle, and arrow Rh indicates a right side of the vehicle.

As shown in FIGS. 1 and 2, in the vehicle bottom structure 100, a fuel tank 110 made of resin is mounted to the bottom of the vehicle on the rear side of the vehicle, and a muffler silencer 120 is installed rearward of the fuel tank 110. Moreover, a muffler pipe 130 extending from an engine at the front of the vehicle passes the side of the fuel tank 110 on the right side of the vehicle and is connected to the muffler silencer 120. A portion of the fuel tank 110 which the muffler pipe 130 passes by does not protrude downward and has a reduced thickness so that interference with the muffler pipe 130 is avoided. This portion having the reduced thickness is shown as a recess 112 in the drawings.

A suspension member 140 extending in a width direction of the vehicle is installed between the fuel tank 110 and the muffler silencer 120. The suspension member 140 is a so-called torsion beam (also referred to as a cross beam) and is coupled to trailing arms at right and left ends.

In the case where the vehicle is involved in an accident such as a rear-end collision, a load toward the front of the vehicle is applied to the muffler silencer 120, and the muffler silencer 120 may be displaced. Also, with regard to the muffler pipe 130 connected to the muffler silencer 120, the muffler pipe 130 is unlikely to deform because it is formed of a rigid member, and there is the risk that it is displaced together with the muffler silencer 120.

The vehicle bottom structure 100 includes a stopping member 150 so that the muffler silencer 120 and the muffler pipe 130 can be prevented from being displaced and brought into contact with the fuel tank 110 in the event of an accident such as a rear-end collision. The stopping member 150 is suspended from the bottom of the vehicle between the suspension member 140 and the muffler silencer 120. Here, the stopping member 150 is suspended from the bottom of the vehicle on the side, in the width direction of the vehicle, where the muffler pipe 130 is connected to the muffler silencer 120, that is, from the bottom of the vehicle on the right side of the vehicle.

Figure 3:
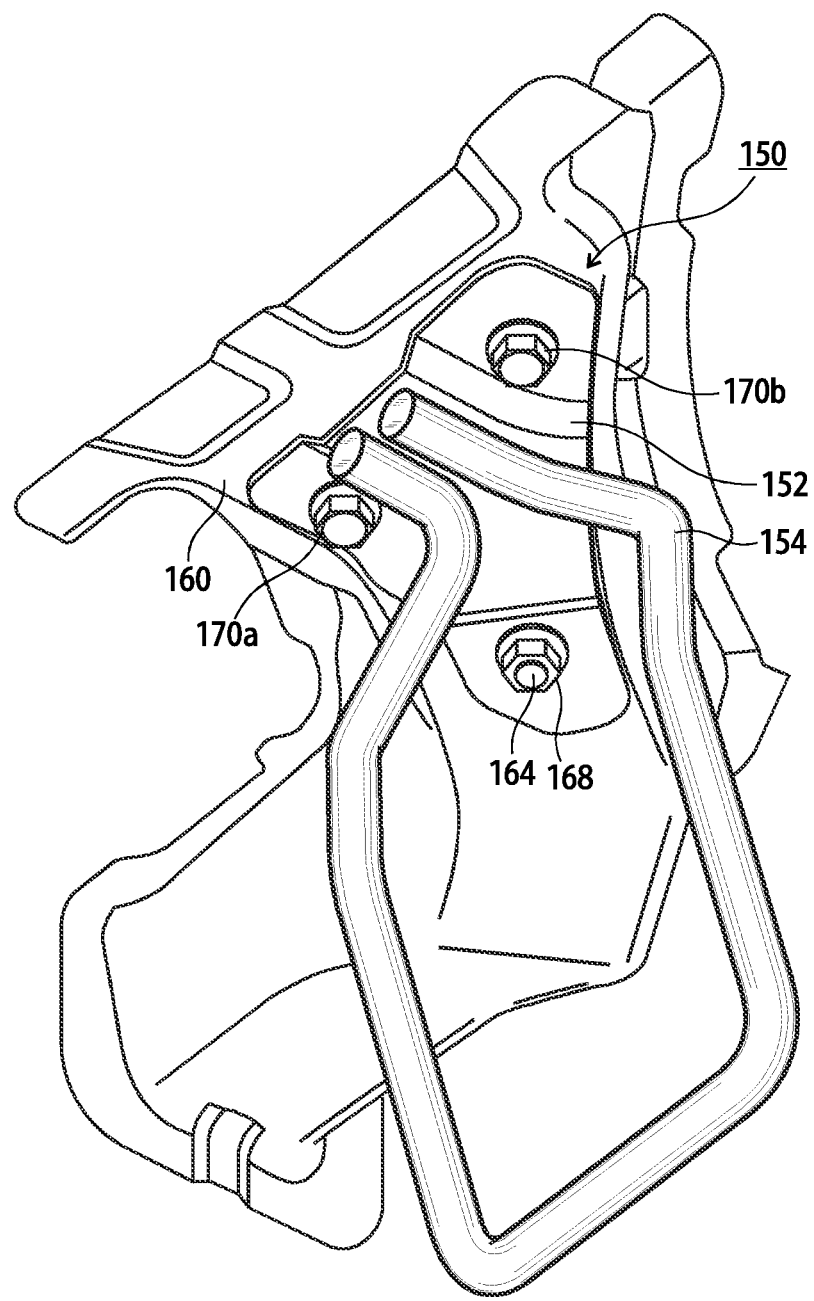
FIG. 3 is a perspective view of a stopping member shown in FIG. 1 as seen from below.
Figure 4:
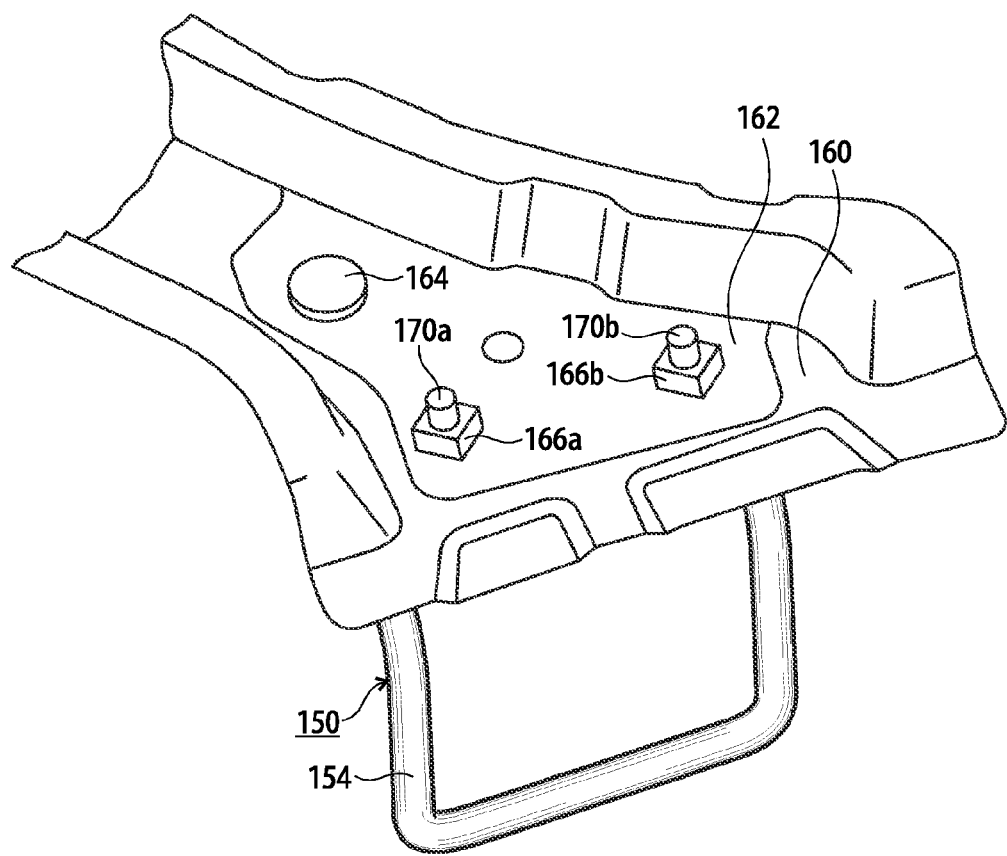
FIG. 4 is a perspective view of the stopping member shown in FIG. 1 as seen from above.

FIG. 3 is a perspective view of the stopping member 150 shown in FIG. 1 as seen from below. FIG. 4 is a perspective view of the stopping member 150 shown in FIG. 1 as seen from above. As shown in FIGS. 3 and 4, in the present embodiment, the stopping member 150 is composed of a bracket portion 152 suspended from the bottom of the vehicle and a frame portion 154 welded to the bracket portion 152 and having a shape extending downward from the bottom of the vehicle.

The frame portion 154 is formed by bending a round steel bar in the form of a round bar into an annular shape, and is connected to the bottom of the vehicle at both ends via the bracket portion 152. The round steel bar is used because it is easily shaped, for example, bent into an annular shape and manufacturing cost can be suppressed and because the strength required of the frame portion 154 can be easily achieved. However, a square steel bar and steel bars having other shapes may also be used. Also, the material is not limited to steel, and any material that has suitable rigidity and elasticity (ability to absorb load) may be used. It should be noted that although the frame portion 154 herein is coupled to the bottom of the vehicle by being welded to the bracket portion 152 at both ends, the frame portion 154 may also be welded (coupled) directly to the bottom of the vehicle.

For reasons such as the demand for weight reduction and the suitable ease of deformation, the frame portion 154 is formed into an annular shape in the present embodiment, but is not limited to such a shape and may be, for example, a plate-like member.

The bracket portion 152 is fixed to a vehicle body floor brace 160 provided at the bottom of the vehicle. An upper portion of the vehicle body floor brace 160 is reinforced by spot welding a reinforcement component 162 thereto. An end of a stud bolt 164 is embedded in the reinforcement component 162, and two weld nuts 166a and 166b are disposed on top of the reinforcement component 162.

The bracket portion 152 of the stopping member 150 is fastened to the vehicle body floor brace 160 and the reinforcement component 162 by the stud bolt 164 and a nut 168, and bolts 170a and 170b and the weld nuts 166a and 166b. The stud bolt 164 penetrates the reinforcement component 162 and the vehicle body floor brace 160 and protrudes therefrom, and therefore can be used as a positioning pin during fastening of the bracket portion 152 of the stopping member 150. Adopting the method of fastening and fixing the bracket portion 152 of the stopping member 150 with bolt and nut has the effect of increasing flexibility of the assembly in a factory.

Figure 5:
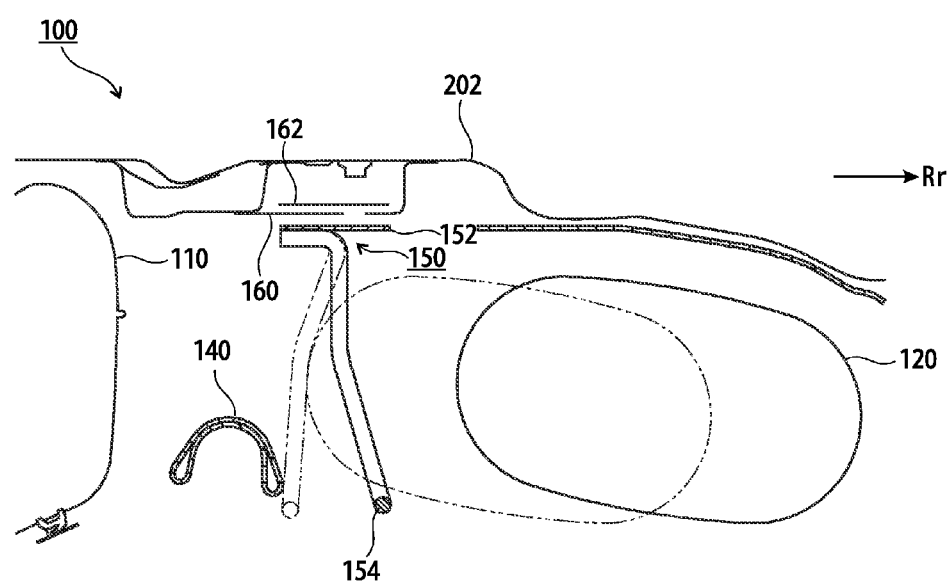
FIG. 5 is a cross-sectional view taken along line A-A in FIG. 1.

FIG. 5 is a cross-sectional view taken along line A-A in FIG. 1. FIG. 5 is illustrated in a simplified and schematic manner in order to facilitate the understanding. In FIG. 5, displacement of the muffler silencer 120 and the stopping member 150 in the event of an accident such as a rear-end collision is illustrated by long dashed double-short dashed lines.

As shown by the solid lines in FIG. 5, in the vehicle bottom structure 100, the vertical position of the muffler silencer 120 and the vertical position of the stopping member 150 are set to overlap (overlap when seen from a fore-and-aft direction of the vehicle). The suspension member 140 is set to be on a trajectory obtained by rotating the stopping member 150 to the front side of the vehicle around the point at which the stopping member 150 is suspended from the bottom of the vehicle.

In other words, the stopping member 150 is disposed in a position sandwiched between the muffler silencer 120 and the suspension member 140 in the fore-and-aft direction of the vehicle. It should be noted that the vertical position of the fuel tank 110 also overlaps the vertical positions of the stopping member 150, the muffler silencer 120, and the suspension member 140 (overlaps as seen in the fore-and-aft direction of the vehicle).

As shown by the long dashed double-short dashed lines in FIG. 5, in the vehicle bottom structure 100, if the vehicle is involved in an accident such as a rear-end collision and a load toward the front of the vehicle is applied to the muffler silencer 120, the stopping member 150 rotates to the front side of the vehicle while receiving the muffler silencer 120. Then, the stopping member 150 ultimately comes into contact with the suspension member 140 on the rotation trajectory, and displacement of the muffler silencer 120 is stopped.

Thus, exhaust system components reaching a high temperature, namely, the muffler pipe 130 and the muffler silencer 120 can be prevented from being brought into contact with the fuel tank 110. In the present embodiment, since the stopping member 150 is installed on the side where the muffler pipe 130 passes the side of the fuel tank 110 and is connected to the muffler silencer 120, the exhaust system components can be effectively prevented from being brought into contact with the fuel tank 110.

Unlike the technology of forcibly pushing down the muffler silencer, which was described as an example in the "DESCRIPTION OF THE RELATED ART" section above, the vehicle bottom structure 100 does not positively allow the displacement of the muffler silencer. That is to say, if a load toward the front of the vehicle is applied to the muffler silencer 120, the vehicle bottom structure 100 catches the muffler silencer 120 with the stopping member 150 and suppresses the displacement of the muffler silencer 120, rather than promoting the displacement. Accordingly, even when the vehicle bottom structure 100 is adopted, damage to the vehicle body and other troubles do not arise.

Second Embodiment

Figure 6:
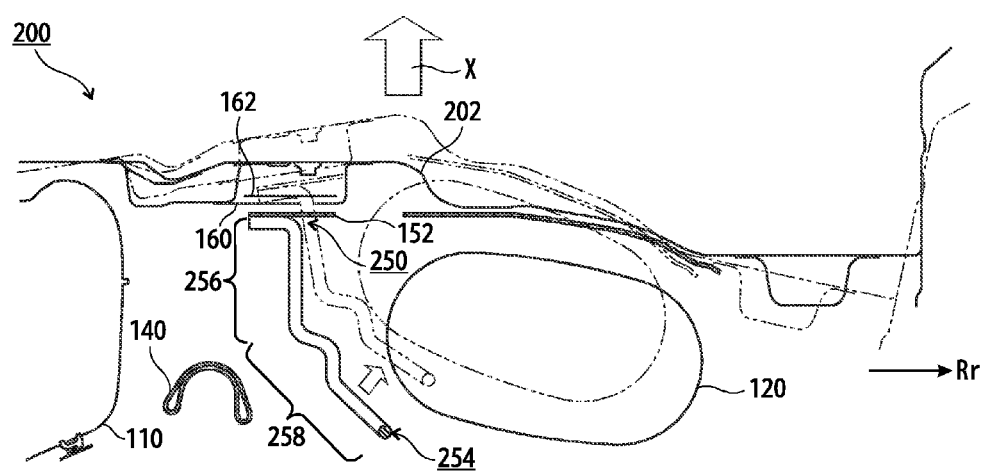
FIG. 6 is a cross-sectional view, corresponding to FIG. 5, of a second embodiment of the vehicle bottom structure according to the present invention.

FIG. 6 is a cross-sectional view, corresponding to FIG. 5, of a vehicle bottom structure 200 according to a second embodiment of the present invention. FIG. 6 is illustrated in a simplified and schematic manner in order to facilitate the understanding. In FIG. 6, displacement of the muffler silencer 120, a stopping member 250, a vehicle body rear floor 202, and the like in the event of an accident such as a rear-end collision are illustrated by long dashed double-short dashed lines.

As shown by the solid lines in FIG. 6, the vehicle bottom structure 200 includes the stopping member 250 suspended from the bottom of the vehicle between the fuel tank 110 and the muffler silencer 120. As is the case with the first embodiment, the stopping member 250 is composed of the bracket portion 152 suspended from the bottom of the vehicle and a frame portion 254 formed by bending a round steel bar in the form of a round bar into an annular shape and welded to the bracket portion 152 at both ends of the frame portion.

The frame portion 254 includes a hanging portion 256 hanging down from the bottom of the vehicle to a location between the upper and lower ends of the muffler silencer 120 and a bent portion 258 extending downward from a lower end of the hanging portion 256 while approaching the muffler silencer 120.

As shown by the long dashed double-short dashed lines in FIG. 6, in the vehicle bottom structure 200, if the vehicle is involved in an accident such as a rear-end collision and the vehicle body rear floor 202 deforms as a result of a load X being applied thereto in such a manner that it is lifted up, the stopping member 250 follows the deformation of the vehicle body rear floor 202 and deforms so as to rotate to the rear side of the vehicle. Then, the bent portion 258 of the stopping member 250 and the vehicle body rear floor 202 sandwich the muffler silencer 120, so that the bent portion 258 suppresses displacement of the muffler silencer 120 toward the front of the vehicle. Thus, exhaust system components reaching a high temperature can be prevented from being brought into contact with the fuel tank 110.

While preferred embodiments of the present invention have been described above with reference to the accompanying drawings, it should be appreciated that the present invention is not limited to the embodiments shown above. It will be apparent for a person skilled in the art that various modifications and variations may be made within the scope of the invention as defined in the appended claims, and those modifications and variations should be understood to be included within the technical scope of the present invention.

The present invention is applicable to a vehicle bottom structure in which a fuel tank made of resin is mounted to the bottom of a vehicle, a muffler silencer is installed rearward of the fuel tank, and a muffler pipe extending from the front of the vehicle passes the side of the fuel tank and is connected to the muffler silencer.

What is claimed is:

1. A vehicle bottom structure for a vehicle in which a fuel tank made of resin is mounted to a bottom of the vehicle, a muffler silencer is installed rearward of the fuel tank, and a muffler pipe extending from a front of the vehicle passes the side of the fuel tank and is connected to the muffler silencer, the vehicle bottom structure comprising:

a suspension member installed between the fuel tank and the muffler silencer and extending in a width direction of the vehicle; and a stopping member suspended from the bottom of the vehicle between the suspension member and the muffler silencer, a vertical position of the stopping member overlapping a vertical position of the muffler silencer;

wherein the suspension member is on a trajectory obtained by rotating the stopping member to a front side of the vehicle around a point at which the stopping member is suspended from the bottom of the vehicle.

2. The vehicle bottom structure according to claim 1, wherein the stopping member includes a frame portion formed by bending a steel bar into an annular shape and coupled to the bottom of the vehicle at both ends of the frame portion.

3. The vehicle bottom structure according to claim 2, wherein the steel bar is a round steel bar.

4. A vehicle bottom structure including a bottom of a vehicle in which a fuel tank made of resin is mounted, a muffler silencer is installed rearward of the fuel tank, and a muffler pipe extending from a front of the vehicle passes the side of the fuel tank and is connected to the muffler silencer, the vehicle bottom structure comprising:
- a stopping member suspended from the bottom of the vehicle between the fuel tank and the muffler silencer, a vertical position of the stopping member overlapping a vertical position of the muffler silencer;
- wherein the stopping member includes a hanging portion hanging down from the bottom of the vehicle to a location between upper and lower ends of the muffler silencer and a bent portion extending downward from a lower end of the hanging portion while approaching the muffler silencer.

5. The vehicle bottom structure according to claim 1, wherein the stopping member is suspended from the bottom of the vehicle on a side, in the width direction of the vehicle, where the muffler pipe is connected to the muffler silencer.

\* \* \* \* \*